United States Patent [19]
Blanton

[11] 3,878,862
[45] Apr. 22, 1975

[54] PNEUMATIC VALVE POSITION INDICATOR

[75] Inventor: James R. Blanton, Richardson, Tex.

[73] Assignee: Otis Engineering Corporation, Dallas, Tex.

[22] Filed: Feb. 2, 1973

[21] Appl. No.: 329,105

[52] U.S. Cl. ............... 137/553; 116/125; 137/557
[51] Int. Cl. ........................................ F16k 37/00
[58] Field of Search ............. 137/553, 557; 116/125

[56] References Cited
UNITED STATES PATENTS

| | | | |
|---|---|---|---|
| 817,911 | 4/1906 | Grinnell | 137/553 X |
| 1,407,810 | 2/1922 | Renshaw | 137/553 X |
| 2,669,247 | 2/1954 | Olah | 137/84 |
| 3,002,374 | 10/1961 | Jacobs | 73/37.5 |
| 3,055,384 | 9/1962 | Puster | 137/85 |
| 3,191,621 | 6/1965 | McKinnon et al. | 137/553 |
| 3,315,250 | 4/1967 | Higgins | 137/85 X |
| 3,447,555 | 6/1969 | Jenney | 137/557 X |
| 3,455,318 | 7/1969 | Jenney | 137/557 X |
| 3,472,276 | 10/1969 | Grove | 137/557 X |
| 3,473,563 | 10/1969 | Tatum | 137/557 |

FOREIGN PATENTS OR APPLICATIONS

| | | | |
|---|---|---|---|
| 1,213,309 | 3/1966 | Germany | 116/125 |
| 1,231,518 | 12/1966 | Germany | 116/125 |

*Primary Examiner*—Alan Cohan
*Assistant Examiner*—Gerald A. Michalsky
*Attorney, Agent, or Firm*—H. Mathews Garland

[57] ABSTRACT

A device for use with a valve having a longitudinally moveable valve stem to indicate that the valve has moved between selected positions. The device includes a pressure release valve connected with a pneumatic system having a pressure gauge. The pressure release valve is associated with an operator rod connectable with the stem of the monitored valve. Means on the operator rod opens the pressure release valve upon movement of the monitored valve causing a drop in pressure in the pneumatic system which is immediately shown by the pressure gauge.

2 Claims, 8 Drawing Figures

Fig. 4-A

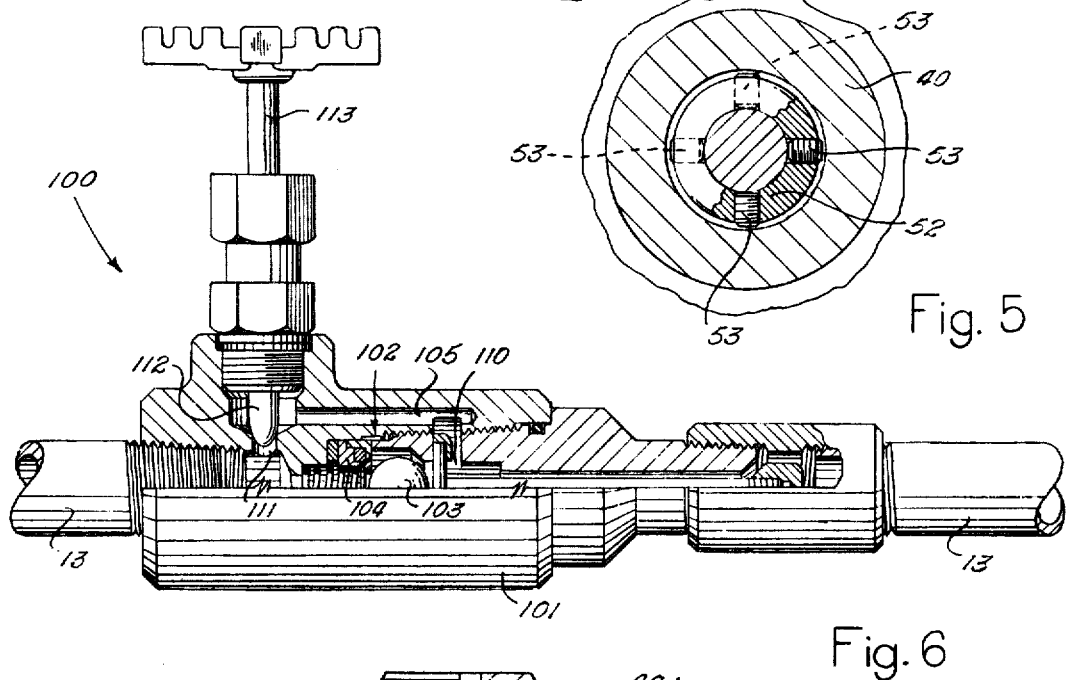

PNEUMATIC VALVE POSITION INDICATOR

This invention relates to valves and more particularly relates to means for indicating movement of a valve to a desired position.

In fluid flow systems, particularly in use in handling petroleum oil and gas, it is well known to use valves to control flow. In many such valves it is not always readily apparent whether the valve is open or closed, particularly, from a brief casual observation of the valve. Also, such valves may be located in a remote area while an indication of a valve condition is desired at a location removed from the valve itself. While devices for indicating valve position are generally not new, many such devices are operated electrically and, thus, present several problems. Fire and explosion are particularly prevalent in oil and gas systems. Every means possible must be taken to provide maximum safety. Additionally, oil and gas systems frequently are located in areas where electrical power is not readily available.

It is an object of the invention to provide apparatus for indicating the position of a valve.

It is another object of the invention to provide a new and improved device operable in a pneumatic system to indicate a particular desired position or change of position of a valve.

It is another object of the invention to provide a device of the character described which is activated by longitudinal movement of a valve stem to release pressure in a pneumatic system which includes a pressure indicator for showing a drop in pressure responsive to the change of the monitored valve position.

It is another object of the invention to provide a valve position indicator which is usable with standard commercially available valves for providing a means to indicate a change of position or condition of such valves.

It is another object of the invention to provide a valve position indicator which is mechanically linked with the valve being monitored, thereby, eliminating a possible fire hazard and not requiring a source of electrical power.

In accordance with the invention, there is provided a valve position indicator in which includes a pressure release valve connected in a pneumatic system having a means of showing a reduction in or a loss of fluid pressure evidencing movement of the valve being monitored. An operator member operatively associated with the pressure release valve is mechanically connected with the valve stem of the monitored valve for opening the pressure release valve in response to movement of the monitored valve. When the valve operator is moved by the monitored valve, the pressure is released in the pneumatic system so that a pressure sensor in the pneumatic system indicates the movement of the monitored valve.

The objects and advantages of the invention together with more specific details of preferred embodiments thereof will be better understood from the following detailed description taken in conjunction with the accompanying drawings wherein.

Figure 2:
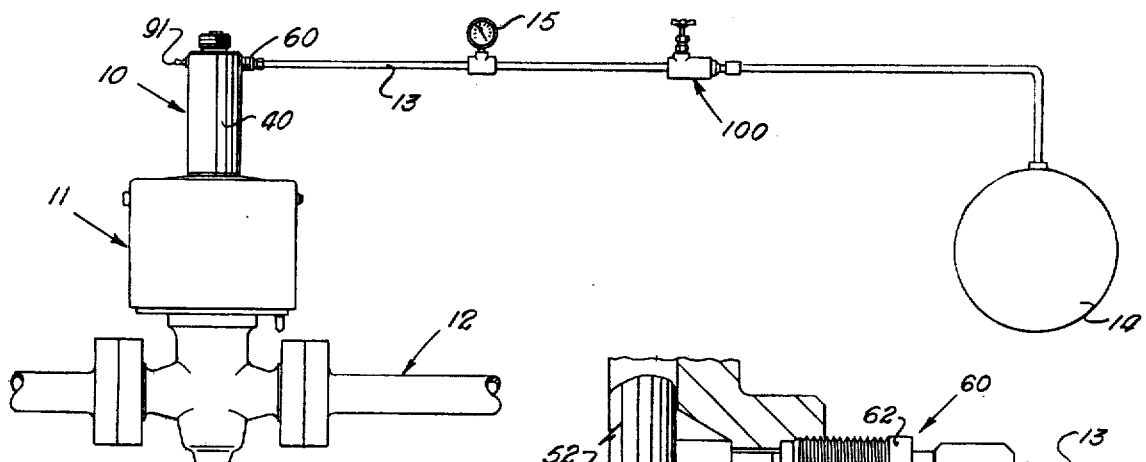
FIG. 2 is a schematic view in elevation of another form of pneumatic system including a valve position indicator constructed in accordance with the invention.
Figure 4:
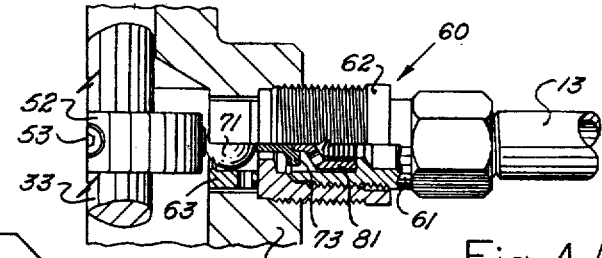
FIG. 4 is an enlarged fragmentary view in section and elevation of the pressure release valve of the device of the invention.
Figure 4:
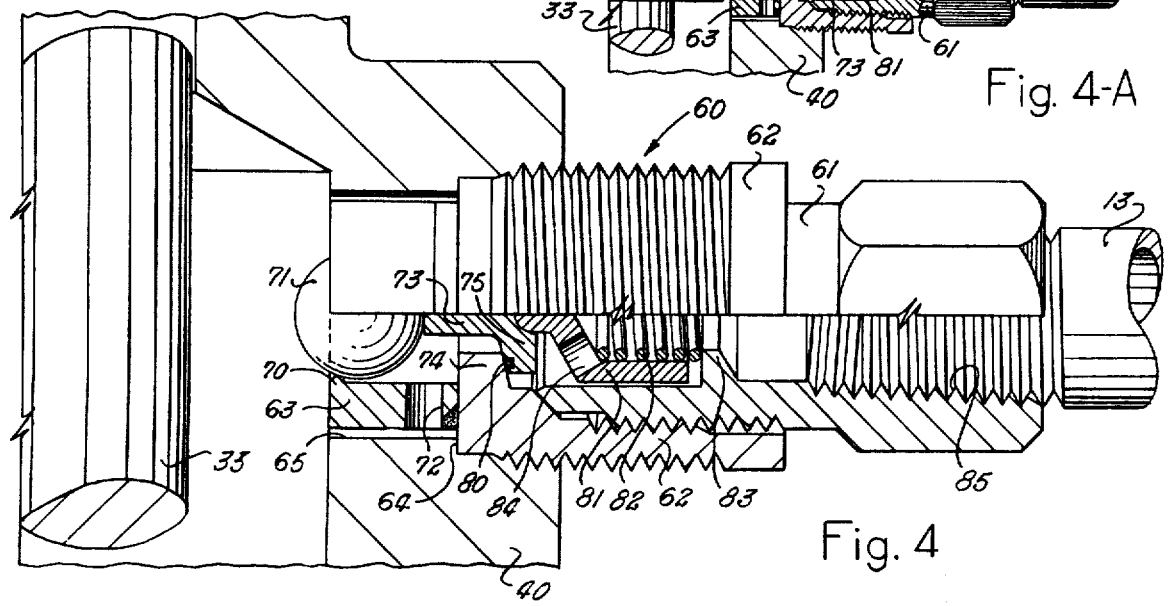
Figure 3:
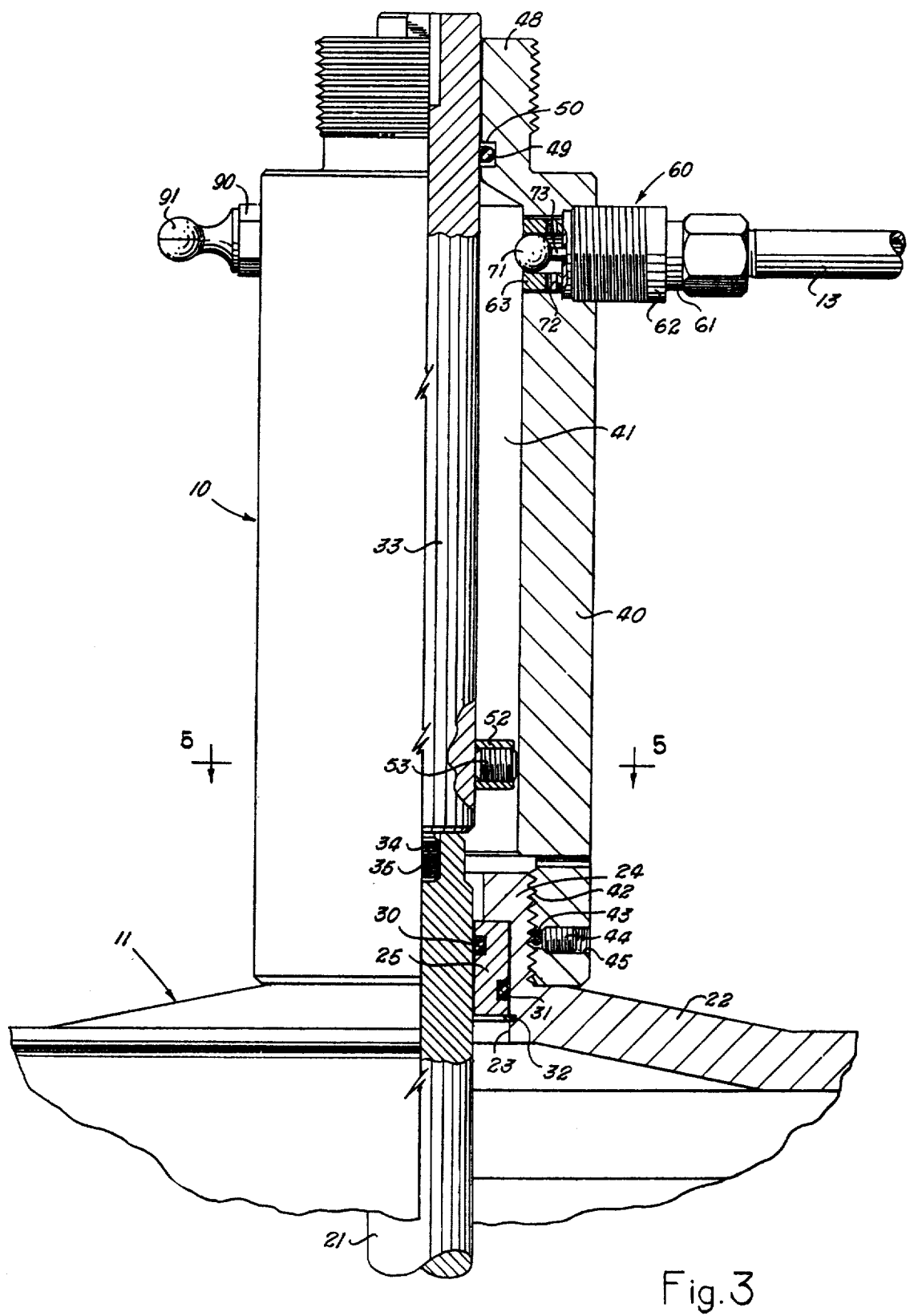
FIG. 3 is an enlarged fragmentary view in section and elevation of one form of valve position indicator embodying the invention connected with a valve monitored by the device.

FIG. 4-A is a reduced fragmentary view in section and elevation similar to FIG. 4, showing the pressure release valve of the device opened;

FIG. 5 is a view in section along the line 5—5 of FIG. 3;

FIG. 6 is a fragmentary view in elevation and section of a velocity check valve used in the pneumatic system illustrated in FIG. 2; and FIG. 7 is a fragmentary view in section and elevation of another embodiment of a valve position indicator constructed in accordance with the invention.

Figure 1:
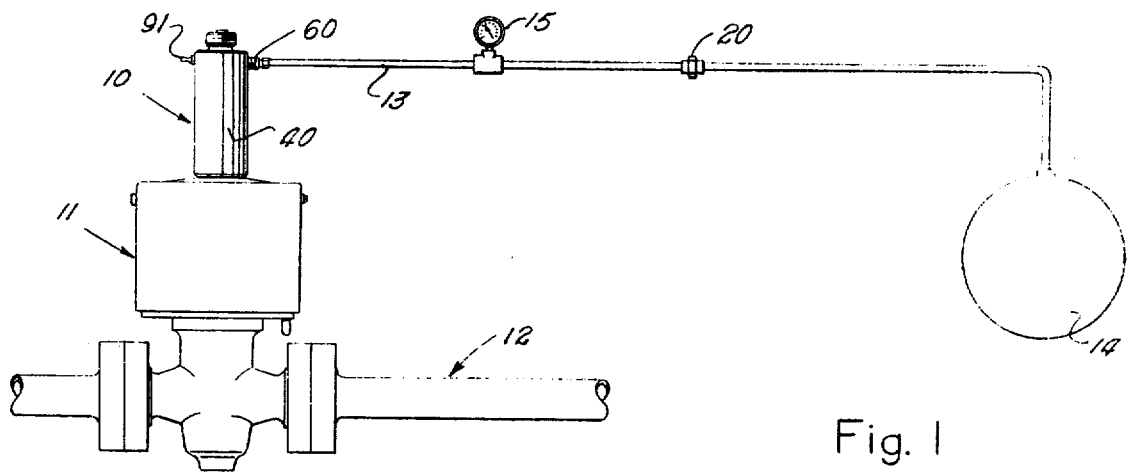
FIG. 1 is a schematic view in elevation of one form of pneumatic system including a valve position indicator in accordance with the invention.

Referring to FIG. 1 of the drawings, a valve position indicator 10 embodying the invention is shown mounted on a gate valve 11 included in the flowline 12 for controlling the flow of fluids such as oil, gas, and the like through the flowline. The valve position indicator 10 is connected by a conduit 13 to a suitable source of fluid pressure 14. A pressure gauge 15 and a choke 20 are included in the conduit 13 between the indicator 10 and the pressure source 14. Movement of the monitored valve 11 activates the indicator 10 which releases the fluid pressure in the conduit 13. The pressure reduction in the conduit 13 is shown by the gauge 15 providing an indication of the movement of the valve 11 between predetermined positions or conditions, such as from open to closed or from closed to open.

Referring to FIGS. 3, 4, and 4A, the specific details of one form of the valve position indicator as used in the system of FIG. 1 are illustrated. The gate valve 11 is a commercially available valve generally of the type designated as a TYPE U OTIS PNEUMATIC ACTUATOR/GATE VALVE COMBINATION as shown at pages 3520 and 3521 of the COMPOSITE CATALOG OF OILFIELD EQUIPMENT AND SERVICES, 1972-73, Edition, published by World Oil, Houston, Tex. The valve 11 has a valve stem 21 coupled at a lower end with a gate valve member, not shown, for controlling flow through the flowline 12. The valve 11 has a fluid pressure operated actuator system which includes a pressure cylinder having a head 22. The head 22 has central opening 23 which extends upwardly through externally threaded nipple 24 formed on the head. A seal assembly 25 having internal and external O-ring seals 30 and 31, respectively, is supported by a lock ring 32 within the opening 23 of the head for sealing around the valve stem 21.

The valve position indicator 10 has an operator rod or stem 33 provided with a reduced threaded lower end portion 34 which is connected into an upwardly opening internally threaded blind hole 35 in the upper end of the valve stem 21. The stem 33 is coaxial with the valve stem 21 effectively extending the length of the valve stem. A valve indicator housing 40 is secured in concentric spaced relation around the stems 21 and 33 defining an annular space 41 between the stems and housing. The lower end of the housing 40 is internally threaded at 42 on the externally threaded nipple 24 of the cylinder head 22. A nylon ball 43 is squeezed against the nipple threads by a set screw 44 engaged in a side opening hole 45 in the lower end portion of the housing to lock the housing on the nipple. The upper end of the housing 40 is provided with a reduced externally threaded portion 48 for connection of a lockout cap, not shown, for locking the stem 33 against upward movement to prevent opening or closing of the valve 11 as shown and described at page 3520 of THE COMPOSITE CATALOG OF OILFIELD EQUIPMENT AND SERVICES, supra. A ring seal 49 in a recess 50 of the housing end portion 48 seals around the stem 33. An operator ring 52 is secured at a desired location along the length of the stem 33 by a plurality of set screws 53 threaded through the ring against the outer surface of the stem.

A pressure release valve 60 is connected through the sidewall of the housing 40 near the upper end of the housing for coaction with the operator ring 52 responsive to movement of the stem 33 to open the pressure release valve and reduce the pressure in the conduit 13 for providing an indication of valve movement on the pressure gauge 15. The valve 60 includes a tubular housing 61 threaded into an adaptor sleeve 62 secured in the sidewall of the housing 40. An annular ball retainer 63 is welded on the inward end face 64 of the sleeve 62 disposed within the inward portion of the side opening 65 in the wall of the housing 40. The ball retainer has an internal annular lip 70 which retains a valve operator ball 71 against inward movement in the bore of the ball retainer. A side port 72 in the ball retainer 63 prevents a pressure differential developing across the ball 71 at any time during the operation of the device and aids in flow through the valve when open. A valve member 73 coacts with an internal annular valve seat 74 in the sleeve 62 to control the flow through the valve 60. The valve 73 has an external annular flange 75 provided with a ring seal 80 which seats against the face of the valve seat 74 for shutting off flow through the valve 60 when the valve member 73 is in the closed position shown in FIG. 4. The valve member 73 is biased to the seated closed position shown by the spring retainer 81 within the housing 61. A spring 82 is confined compressed within the spring retainer between the retainer and an internal annular flange 83 of the housing 61. The force of the compressed spring urges the spring retainer toward the valve member 73 biasing the valve member toward the seated closed position shown. The inward end face of the valve member 73 engages the valve operator ball 71 so that outward movement of the ball will force the valve member 73 from the seat 74 to open the valve 60. The spring retainer has a plurality of flow ports 84 to permit flow along the length of the valve 60 when the valve member 73 is at the open position. The pressure release valve housing 61 is internally threaded at 85 for connection with the conduit 13 of the pneumatic system. Fluid pressure is released from the conduit 13 through the bore of the valve body 61, along the spring 82 within the spring guide 81, and inwardly through the ports 84 in the spring guide. The fluid flows along the concentric bores of the housing 61 and the sleeve 62, past the valve seat 74 when the valve member 73 is forced outwardly from the seat. The fluid flows between the valve seat 74 and the flange 75 of the valve member 73 and around the ball 71 inwardly into the housing 40.

The fluid enters the annulus 41 from which it exhausts to the atmosphere through a fitting 90 secured through the wall of the housing 40. The fitting 90 is protected by a conventional rubber nipple 91 having a slit type opening which is normally closed and opens under pressure to permit escape of fluids from the annulus 41.

In the operation of the valve position indicator 10 in the system shown in FIG. 1, the conduit 13 is connected from the pressure release valve 60 through a suitable conventional pressure gauge 15 and a standard choke 20 to a source of fluid pressure 14. The choke 20 includes a flow restriction, not shown, to reduce the flow rate of the pressure fluid from the source 14 through the line 13 when the pressure release valve 60 is opened. The pressure source 14 may be any suitable fluid filled container such as commercially available pressure cylinders containing such gases as oxygen, carbon dioxide and the like. The pressure within the cylinder 14 is communicated in the conduit 13 through the choke 20 and past the pressure gauge 15 into the housing 61 of the pressure release valve 60. The fluid pressure exists within the housing 61 through the spring guide 81 and the ports 84 of the spring guide to the line of sealing engagement between the ring seal 80 on the valve member 73 and the valve seat 74 of the sleeve adapter 62. The spring 82 urges the retainer 81 inwardly against the valve 73 holding the valve on the seat 74. The inward end of the valve 73 engages the ball 71 holding the ball against the retainer and flange 70 of the ball retainer 63.

At the time of the installation of the valve position indicator on the valve 11, the length of the stroke of the valve stem 21 in moving the valve 11 from open to closed position is taken into consideration to properly position the operator ring 52 on the stem 33. The ring 52 must be secured along the length of the stem 33 at a location at which the ring 52 engages the ball 71 of the valve 60 when the valve stem 21 is raised in closing the valve 11.

Preferably, an inert gas is used in container 14 so that the fire and explosion conditions at the valve 11 are minimized. With the valve position indicator 10 connected into the system as shown in FIG. 1, and the valve stem 21 and position indicator stem 33 in the positions illustrated in FIGS. 3 and 4, the valve 11 is open as shown at page 3520 of THE COMPOSITE CATALOG OF OILFIELD EQUIPMENT AND SERVICES, supra. At such open position of the valve 11, there may be flow along the flowline 12. When the valve 11 is closed, either intentionally or in response to some changing condition to which the valve reacts, the valve stem 21 moves upwardly raising the valve position indicator stem 33. As the valve stem 21 is raised, the operator ring 52 is lifted within the annular space 41 of the housing 40. At the upper end of the stroke of the stem 33 and the operator ring 52, the ring engages the ball 71 of the pressure release valve 60. When the operator ring 52 is lifted into contact with the ball 71, the ball is cammed outwardly against the force of both the spring 82 and the pressure confined by the valve member 73. The ball pushes the valve 73 from the valve seat 74 allowing the pressure fluid from the source 14 to escape between the flange 75 and the valve seat 74 inwardly around the ball through the radial ports 72 of the ball retainer 63 and through the bore of the retainer around the ball into the annular 41. The fluid is permitted to escape to the atmosphere from the annular space 41 through the fitting 90 and the fitting protector 91.

By use of the choke 20 in the conduit 13, the opening of the pressure release valve 60 rapidly reduces the pressure in the conduit so that the pressure gauge 15 provides an almost instantaneous indication of the pressure reduction, which, of course, is an indicator of the movement of the valve 11 to the closed position. More specifically, the drop in the pressure as shown at the gauge 15 tells the observer that the stem 33 has been lifted to the position at which the valve 11 is now closed. While it may take some period of time for the pressure fluid in the cylinder 14 to completely bleed from the cylinder through the conduit 13, the use of the choke 20 causes a sufficient drop in the pressure of the fluid flowing from the cylinder through the conduit that the pressure gauge 15 will remain at a low reading indicating that the valve 11 has closed.

The valve position indicator 10 is easily reactivated when the valve 11 is again opened. The stem 33 moves downwardly lowering the operator ring 52 back to the position shown in FIG. 3 releasing the ball 71 to return to the position shown in FIG. 4. The spring 82 expands forcing the spring guide 81 inwardly moving the valve 73 back to the closed position at which the ring seal 80 is seated on the valve seat 74 closing the pneumatic system so that the cylinder 14 may be recharged.

The system illustrated in FIG. 2 is identical to that of FIG. 1 in all respects other than the substitution of a velocity check valve 100 in the conduit 13 between the gauge 15 and the pressure cylinder 14 in place of the choke 20. The velocity check valve 100 serves several functions, the most important being to permit the operation of the valve position indicator 10 without fully depleting the pressure fluid from the cylinder 14. The valve 100 may be a TYPE M OTIS VELOCITY CHECK VALVE as illustrated and described at page 3531 of the COMPOSITE CATALOG OF OILFIELD EQUIPMENT AND SERVICES, supra, and in FIG. 6 herein. Referring to FIG. 6, the velocity check valve includes a body 101 and a ball and seat assembly 102 having a ball valve member 103 which is movable from the open position shown to a seated closed position against the valve seat 104 by fluid flow past the ball through the valve housing. The valve body has a bypass flow channel 105 which communicates with the central bore through the valve body upstream of the ball 103 at 110 and downstream of the ball through a side port 111. A needle valve 112 connected with an operator handle 113 is movable radially to open and close the port 111 for bypassing the ball valve 103.

In the use of the pneumatic system of FIG. 6, when the valve 11 is closed causing the opening of the pressure release valve 60, the rush of pressure fluid through the velocity check valve 100 moves the ball valve 103 in the check valve against the seat 104 closing the velocity check valve preserving the remaining pressure within the cylinder 14 and the conduit 13 up to the check valve. The closing of the check valve thereby isolates the section of the conduit 13 between the velocity check valve and the pressure release valve 60 so that the pressure gauge 15 indicates the immediate drop of pressure to atmospheric. The pressure gauge continues to indicate the closure of the valve 11 until the indicator 10 and the check valve are reset upon reopening the valve 11. The resetting of the valve indicator 10 has been previously described in connection with the FIG. 1. After the valve 11 is opened allowing closure of the pressure release valve 60, the velocity check valve is reset by first operating the handle 113 to lift the needle valve 112 from the port 111. With the port 111 open, pressure within the line 13 upstream of the velocity check valve is communicated through the bypass passage 105 and the port 111 downstream of the ball valve 105 so that the pressure is equalized across the ball valve. The spring associated with the ball valve pushes the ball valve upstream to an open position and the needle valve 112 is again closed so that the velocity check valve is activated for operation when the flow rate through the check valve again increases to a sufficient rate to force the ball 103 back to the closed position. In all respects other than the operation of the velocity check valve, the system of FIG. 2 works exactly like that of FIG. 1.

A modified form 10A of the valve position indicator of the invention is shown in FIG. 7. Those parts of the valve position indicator 10A which are identical to the indicator 10 are referred to by the same reference numerals used in the other figures. Those parts of the indicator 10A which are modified but perform the same functions as in the indicator 10 are denoted in FIG. 7 by the same reference numerals with the postscript "A" added. The indicator stem 33A is threaded along a reduced lower end portion 34A into the upper end of the stem 21 of the valve 11. The stem 33A may be substantially shorter than the stem 33 of the indicator 10 as evidenced in FIG. 7. The housing 40A is essentially identical to the housing 40 other than being substantially shortened. The pressure release valve 60 is secured through the side wall of the housing 40A as described in the indicator 10. The stem 33A has an external annular concave groove 121 which in cross section defines a circular segment of slightly larger radius than that of the ball 71 of the pressure release valve. The groove 121 receives the ball 71 permitting the ball to be at the full inward position at which the valve 60 is closed when the stems 21 and 33A are positioned as illustrated in FIG. 7. Any movement of the stem 21 in either direction raises or lowers stem 33A of the valve position indicator 10A camming the ball 71 radially outwardly from the groove 121 opening the pressure release valve 60 so that the pressure gauge 15 will indicate a drop in pressure and, thus, a movement of the valve 11. So long as the valve stem 21 and the indicator stem 30A are positioned longitudinally to misalign the groove 121 from the ball 71, the ball rests along the wall surface of one of the stems, depending upon direction of movement, thereby, holding the ball and thus the valve 60 in the open position. Return of the valve and indicator stems to the position of FIG. 7 allows the expansion of the spring 82 in the valve 60 forcing the ball 71 into the groove 121, thereby closing the pressure release valve 60. Thus, the indicator 10A provides an immediate showing of any movement of the stem 33A of the indicator, whereas the valve position indicator 10 requires a full stroke of the stem 33 to align the operator ring 52 for opening the pressure release valve 60. In all other respects, the valve position indicators 10 and 10A are essentially identical in structure and operation.

It will now be seen that a new and improved valve position indicator has been described and illustrated for mechanical coupling with a valve to be monitored to operate a pressure system for providing an indication of valve movement without the use of electrical connections. The various systems and embodiments of the position indicator shown permit connection with a pneumatic system which allows remote reading by way of a pressure gauge or similar device to evidence movement of a valve located at a position away from the pressure gauge. In both forms shown, an indication of valve movement is immediately provided without requiring complete depletion of the pressure source. In one form of the apparatus using a velocity check valve, a certain amount of pressure in the source may be retained.

While the forms of the apparatus described and illustrated along with the auxiliary equipment with which the valve position indicators are used have been generally shown in terms of the closing of a monitored gate valve, it will be recognized that the position indicator is equally useable to evidence the opening of a valve and in the case of the embodiment shown in FIG. 7, any movement of the monitored valve from a given position may be indicated by means of the device of the invention. Other forms of valves may be monitored provided they have valve stem movement which can be adapted to open the pressure release valve 60.

What is claimed is:

1. A system for indicating a change of position of a gate valve in a first fluid system having a longitudinally movable valve stem comprising: a source of fluid pressure independent of said first fluid system; a conduit connected with said source of fluid pressure; a pressure release valve connected with said conduit; a pressure gauge connected with said conduit between said pressure source and said pressure release valve to indicate a change of fluid pressure in said conduit; a valve stem extension member connected with the valve stem of said monitored valve and operably connected with said release valve, said extension member having a first operator surface for permitting said release valve to remain closed and a second operator surface for engaging said pressure release valve for opening said release valve responsive to movement of said stem of said monitored valve to release pressure in said conduit whereby a pressure decrease on said pressure gauge reflects movement of said monitored valve; and a velocity check valve in said conduit between said pressure source and said pressure gauge, said velocity check valve being adapted to close in response to the opening of said pressure release valve whereby the section of said conduit including said pressure gauge is relieved of fluid pressure responsive to the opening of said pressure release valve for indicating a change of pressure on said pressure gauge reflecting movement of said monitored valve without releasing all pressure within said pressure source.

2. A device for sensing the movement of a monitored valve stem and releasing fluid pressure in a pressure system responsive thereto comprising: a housing securable on the body of said monitored valve around the valve stem of said valve; a valve stem extension slidably secured in said housing and having means for connection into said stem of staid monitored valve, said valve stem extension having a pressure release valve operating means thereon; and a pressure release valve having a valve body secured with said housing, said valve body and said housing being provided with connecting bores leading to the interior of said housing; an operator ball cage secured with an inward end of said valve body within said housing, said ball cage having a bore connecting with the bore of said valve body and having a ball seat at an inward end thereof at said valve body bore; a valve operator ball disposed within said cage, said ball being larger in diameter than said ball seat, a portion of said ball projecting into the bore of said housing when said ball is engaged on said ball seat for engagement by said operating means on said valve stem extension responsive to movement of said valve stem extension by said valve stem of said monitored valve; said valve body being provided with an internal annular valve seat around the bore of said body; a valve member disposed in said bore of said body and having an annular valve surface engageable with said valve seat in said body, said valve member having an operator extension projecting into said ball cage engaging said operator ball whereby said operator ball moves said valve member between a seated inward position and an open outward position responsive to engagement by said release valve operating means with said ball member; a valve spring disposed in said bore of said body for biasing said valve member toward valve seat in said body; a spring retainer around said spring and provided with a portion engaging said valve member whereby said spring urges said spring retainer against said valve member for biasing said valve member inwardly toward said valve seat and said operator ball; and connecting means secured with said valve body for communicating said bore of said valve body with said pressure system so that said pressure release valve releases pressure in said system responsive to the movement of said operator ball.

* * * * *